United States Patent
Gorner et al.

(10) Patent No.: US 8,402,366 B1
(45) Date of Patent: Mar. 19, 2013

(54) FORMAT TAG STACKS FOR STREAM-PARSING FORMAT INFORMATION

(75) Inventors: Martin Gorner, Meudon (FR); Rangasamy Surendran, Tamil Nadu (IN); Palanidaran Chidambaram, Tamil Nadu (IN)

(73) Assignee: Amazon Technologies, Inc., Reno, NV (US)

( * ) Notice: Subject to any disclaimer, the term of this patent is extended or adjusted under 35 U.S.C. 154(b) by 480 days.

(21) Appl. No.: 12/641,969

(22) Filed: Dec. 18, 2009

(51) Int. Cl.
*G06F 17/21* (2006.01)
*G06F 17/30* (2006.01)

(52) U.S. Cl. ........ 715/234; 715/235; 715/238; 715/241; 715/243; 715/254

(58) Field of Classification Search .............. 715/205, 715/234, 235, 238, 241, 242, 243, 251, 253
See application file for complete search history.

(56) References Cited

U.S. PATENT DOCUMENTS

| | | | |
|---|---|---|---|
| 5,708,806 A * | 1/1998 | DeRose et al. | 715/234 |
| 6,631,373 B1 * | 10/2003 | Otani et al. | 1/1 |
| 7,073,123 B2 * | 7/2006 | Friedman et al. | 715/240 |
| 7,313,758 B2 * | 12/2007 | Kozlov | 715/234 |
| 7,810,024 B1 * | 10/2010 | Goldman | 715/234 |
| 7,870,502 B2 * | 1/2011 | Rogers et al. | 715/770 |
| 7,930,630 B2 * | 4/2011 | Masood | 715/234 |
| 2002/0087596 A1 * | 7/2002 | Lewontin | 707/513 |
| 2008/0092066 A1 * | 4/2008 | Edlund et al. | 715/760 |
| 2008/0270345 A1 * | 10/2008 | Barlow et al. | 707/2 |
| 2009/0138491 A1 * | 5/2009 | Chowdhury | 707/100 |

\* cited by examiner

*Primary Examiner* — Stephen Hong
*Assistant Examiner* — Wilson Tsui
(74) *Attorney, Agent, or Firm* — Lee & Hayes, PLLC

(57) ABSTRACT

Electronic content may be formatted using tag format stacks that store format information up to a predetermined location in the electronic content. The electronic content may be formatted for display using data in the format tag stack and without parsing the entire electronic content. In some aspects, an encoder may receive content that includes a predetermined format and body text. The encoder may parse the content via a sequential process to identify active format tags at certain locations within the content. Next, the encoder may store the active format tags as a format tag stack in the content. In further aspects, a decoder may select a portion of the content for display. The format tag stack may be updated by parsing the portion of the content that is not included in the format tag stack. The content may be formatted based on instructions of the updated format tag stack.

25 Claims, 7 Drawing Sheets

FORMAT TAG STACKS FOR STREAM-PARSING FORMAT INFORMATION

BACKGROUND

An increasingly large portion to textual content is disseminated to electronic viewing devices such as computers and mobile telephones. These viewing devices enable fast and low cost delivery of the electronic content via a network such as the Internet, mobile telephone networks, and so forth.

The electronic textual content is typically formatted by a viewing device prior to display to users. The viewing device may format text based on formatting instructions that are included with the electronic content. For example, hypertext markup language (HTML) code may be used to format (style) the content. In this way, a viewing device may display content as intended by an author or publisher.

Much of the content formatted by HTML (e.g., web pages) is relatively short in length (e.g., less than 1000 words) and may be stored using only a few hundred kilobytes of data storage. However, other pieces of electronic content (large documents) may require many megabytes of data storage such as books or other multi-page publications.

The formatting of large documents, particularly when using HTML, presents challenges that include load time performance, memory consumption, and formatting accuracy. These challenges may be of particular concern when a user navigates to a new user-selected location in the large document. In this situation, a browser (or other viewing software) typically reconstructs a viewable portion of the large document from the beginning to accurately identify and apply all formatting up to the user-selected location. This formatting process may be time consuming for large documents, may result in undesirable user perceived latency, and may require excessive amounts of device memory (e.g., RAM) which may impact performance of a device.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As discussed above, formatting a large document using HTML may be a time consuming process when the entire document is loaded into memory. One technique to reduce a load time of a document is to segment the document into smaller and more manageable sections called text records. Each text record may then be loaded separately upon a user request or when otherwise needed. One problem with use of text records is a possible loss of formatting that is not continued from a previous text record. For example, a first text record may include a format tag to make text bold. At a second text record, unless this tag is reinstated, content may be loaded without the bold tag, and thus not be displayed as intended by an author or publisher.

Techniques and systems are disclosed herein to store format tags in a stack, which may be saved at uniform or non-uniform intervals in the document. HTML or other formatting software may retrieve the tag stack that includes formatting information up to a predetermined location called a restore point in the document, Additional text may be parsed to determine additional format tags between the restore point where the format tag stack is known and the location of a text to be displayed, such as when the user navigates to a new location of text in the document.

The techniques and systems described herein may be implemented in a number of ways. Example implementations are provided below with reference to the following figures.

Illustrative Environment

Figure 1:
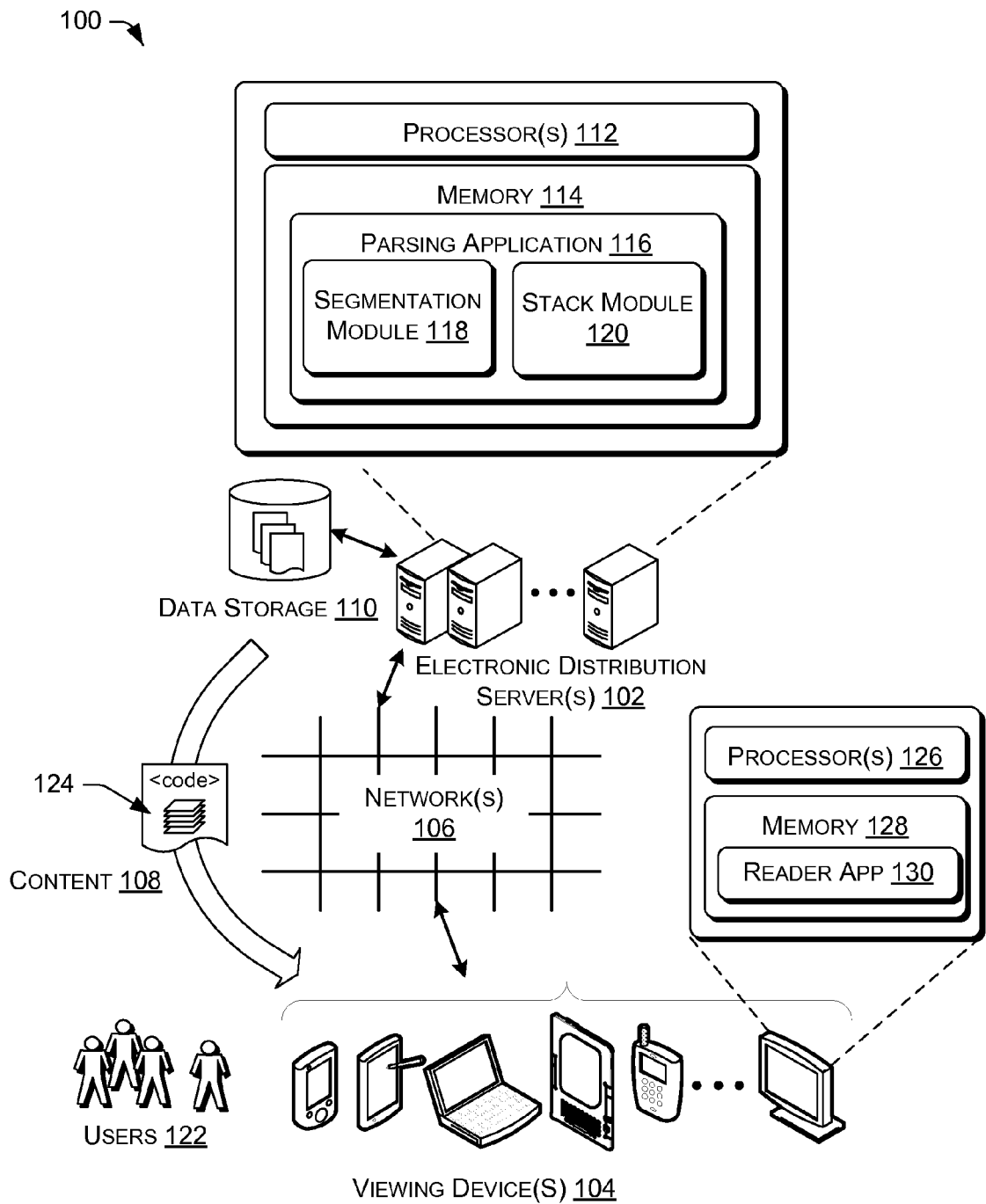
FIG. 1 is a schematic diagram of an illustrative environment that includes various computing devices that create and/or read format tag stacks in electronic content.

FIG. 1 is a schematic diagram of an illustrative environment 100 that includes various computing devices that create and/or read format tag stacks in electronic content. The environment 100 may include electronic distribution server(s) 102, and viewing device(s) 104. In some embodiments, the electronic distribution server 102 and the viewing device 104 may be in communication via one or more network(s) 106 to facilitate transfer of electronic content ("content") 108 including textual and/or image content. In addition, or as an alternative, the content 108 may be transferred between the electronic distribution server 102 and the viewing device 104 via removable storage media such as secure digital (SD) memory cards, portable hard disks, and other portable storage media and/or devices.

The content 108 may be textual content for display on the viewing device 104. In addition or in the alternative to text, the content 108 may include other objects, images, video, audio and the like, which is made available via a page accessible via the viewing device(s) 104. For example, the content 108 may include books, magazines, newspapers, newsletters, manuals, guides, references, articles, reports, documents, or other text-based content that is stored in electronic form. In some embodiments, the content 108 may include formatting code (e.g., HTML) and other necessary data to cause a display of the content as desired by an author or publisher of the content. At least initially, the content may be stored in data storage 110.

The electronic distribution servers 102 may perform various operations with the content 108. As illustrated, the electronic distribution servers 102 are equipped with one or more processors 112 and memory 114. The memory 114 may include applications, modules, and/or data. In some embodiments, the memory 114 may include a parsing application 116 that may facilitate creation and management of format tag stacks and other related operations.

The parsing application 116 may include a number of modules such as a segmentation module 118 and a stack module 120. The segmentation module 118 may be used to segment a large electronic document into two or more text records. In some embodiments, each text record may be of substantially the same data size. The text records may be created between break points, which may be formed based on predetermined data chunk sizes, a predetermined number of characters or words, break points in the content (e.g., chapters, pages, etc.), or other types of break points. In various embodiments, the text records may be between 2 kilobytes and 10 kilobytes in size, which may enable the viewing device to parse (load) the text record for display to a user with minimal user-perceived latency.

In accordance with one or more embodiments, the stack module 120 may create a format tag stack for each segment. The stack module 120 may analyze the content 108 from a beginning of the content to record formatting tags. Formatting tags may include any type of formatting indicator that is used by a formatting software (e.g., HTML, LaTeX, etc.) to determine a format of the text and/or images of the content 108. For example, in HTML, the format tags may include tags that format text as headers, bold, italics, underline, and so forth. In addition, format tags may also include table formats and paragraph formats. Typically, format tags may begin in a first location (e.g., an HTML tag "<b>" initiates a bold format) and ends in a second location (e.g., an HTML tag "</b>" ends a bold format).

The stack module 120 may record the format tags in the content and store active (i.e., currently open) tags in each text record (segment). By recording the format tags, the viewing devices can render a portion of content (rather than the entire content) with proper formatting from the recorded format tags. This allows the viewing devices 104 to render that portion in correct formatting much quicker than having to parse the entire content. In this way, users 122 of the viewing devices 104 may view a portion of the content 108 from a viewing location other than a beginning of the content (e.g., halfway through the content, third chapter, etc.) with minimal user-perceived delay and with proper formatting of the content. The viewing location may correspond to a text record other than the first text record of the content. The viewing location may include a format tag stack that includes format tags that are active up to a point in the text record such that the viewing device 104 can accurately format text and/or images in the text record without parsing the entire length of the content 108, which may result in considerable reduction in user-perceived latency and improved formatting accuracy.

In accordance with various embodiments, the electronic distribution server 102 may transmit the content 108, including format tag stacks 124 to the viewing device 104 for viewing by users 122. In one or more embodiments, the viewing device 104 may include a personal computer, an electronic book reader (e-book reader), a tablet computer, a mobile telephone, a personal digital assistant (PDA), a television, a set top box, a gaming console, or another electronic device. The viewing device 104 may be capable of receiving the content 108 and format tag stacks 124 and causing the display of the content on a display device. The viewing device 104 may include one or more processor(s) 126 and memory 128. The memory 128 may be used to store a reader application 130.

The reader application 130 may process the content 108 (e.g. read HTML code, etc.) and cause a display of the content as formatted text and images. In some embodiments, the reader application 130 may be a Web browser or other browser that can format text and images using HTML code. The reader application 130 may format text and/or images for display by the viewing device 104 such that the text/images are presented (formatted, styled) as intended by a content provider (e.g., the author, editor, publisher, etc.). In some embodiments, the reader application 130 (or sub-operations thereof) may be executed by the electronic distribution server 102 or another remote server such as on an online reader application. Thus, the reader application 130 may be stored and executed locally on the viewing device 104 or remotely on another server (e.g., the editing server 102, etc.).

Figure 2A:
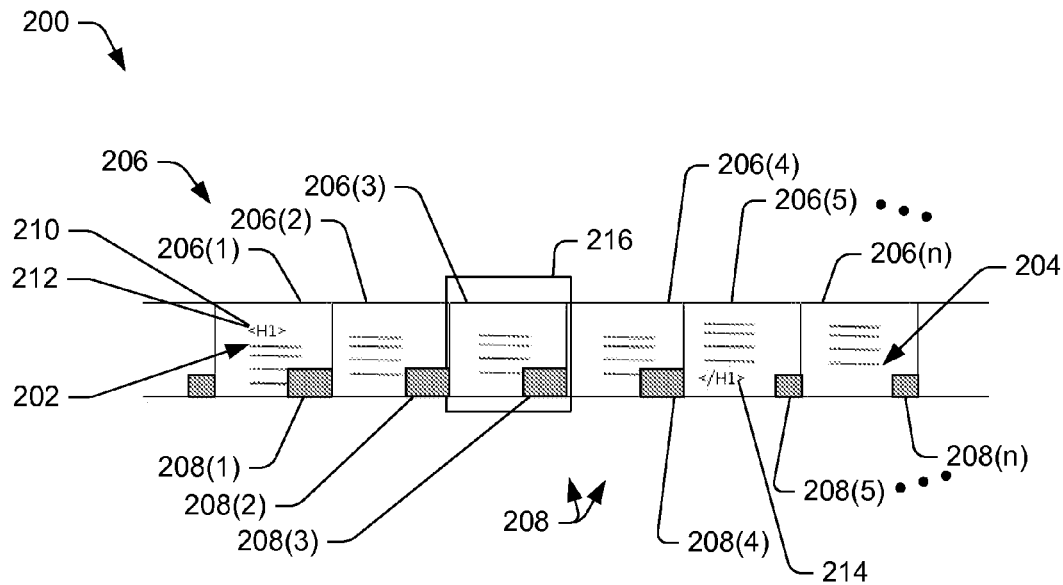
FIG. 2*a* is a schematic diagram of illustrative content that includes format tag stacks stored in a sequence of text records of the electronic content.

FIG. 2a is a schematic diagram of illustrative content 200 that includes format tag stacks stored in a sequence of text records. The content 200 is arranged from a beginning point 202 to an end point 204. The content 200 may be divided into text records 206 via the segmentation module 118, which include a first text record 206(1), a second text record 206(2), a third text record 206(2), . . . , and a last text record 206(n).

Each of the text records 206 includes one of multiple format tag stacks 208. The format tag stacks 208 may include formatting information for each text record up to a point in the content 200. In some embodiments, each of the text records 206 may include one of the format tag stacks 208, such as a first format tag stack 208(1), a second format tag stack 208(2), a third format tag stack 208 (2), . . . , and a format tag stack 208 (n). Each of the format tag stacks 208 may be associated with and identify formats for a particular one of the text records 206, such as the second format tag stack 208(2) may be associated with the second text record 206(2).

As an example, the content 200 includes a format tag 210 in the first text record 206(1). The format tag 210 (e.g., header 1 "H1") may be used to format all text included between an open format tag 212 (in the first text record 206(1)) and a close format tag 214 (in the fifth text record 206(5)). Accordingly, the format tag stacks may indicate which of the format tags 210, if any, are open for a particular record. In some instances, many format tags may be open in a particular text record. Continuing with the example, the second format tag stack 208(2) includes a format tag "H1" to indicate that text in the second text record should be formatted in accordance with the H1 (header 1) format. The last tag stack 208(n) may include a null value because the H1 format tag has been closed in the fifth text record 206(5) and no other format tags are shown in this example. Thus, the text in the last text record 206(n) may not be formatted with the H1 format.

As shown in FIG. 2a, the third text record 206(3) is selected by a parser window 216. The parser window 216 indicates which text record is to be parsed for viewing by the user 122. The content within the parser window 216 (text, etc.) may be parsed by the reader application 130 and made available for display via the viewing device 104. The parser window 216 loads the text and images referenced in the selected text record (e.g., the third text record 206(3)). The parser window 216 then formats the text and images in accordance with any associated format tags in a format tag stack (e.g., the third format tag stack 208(3)).

In some embodiments, only a portion of the content that is in the parser window 216 may be displayed to the user. The portion of the content is referred to as the target location. The reader application 130 may have to update the format tags listed in the tag stack based on what portion of the text and images in the parser window 216 is viewable by the reader application. For example, the format tag stack may list format tags that are open (active) at the beginning of the selected text record. The user 122 may request a display of text (the target location) toward the end of the selected text record. The reader application 130 may then have to update the format tag stack with any intermediate tags located between a start location of the format tag stack and the target location (toward the end of the selected text record) to enable accurate formatting of the content.

Figure 2B:
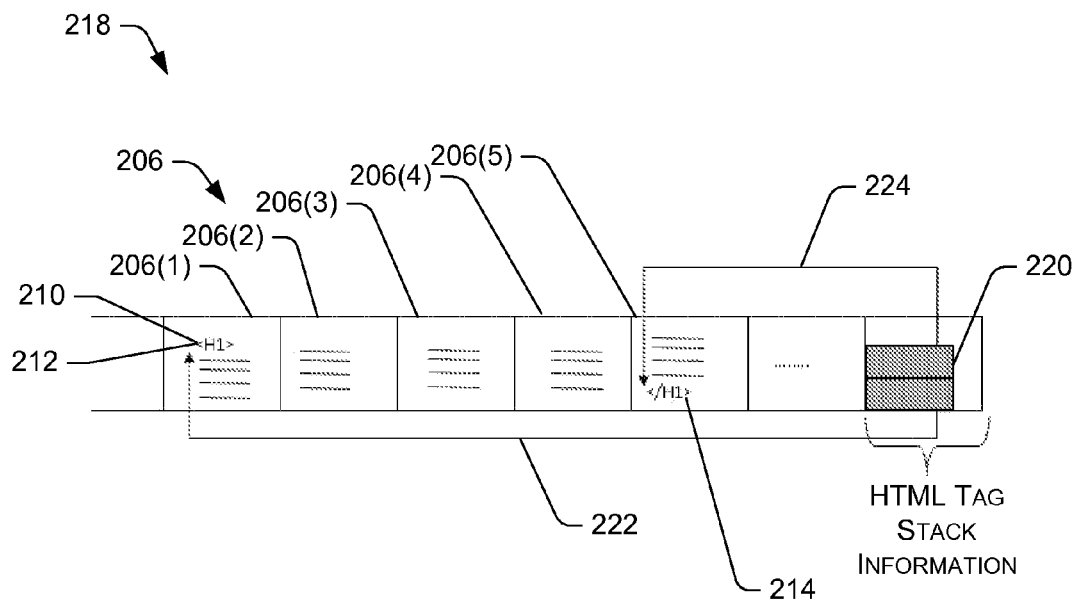
FIG. 2*b* is a schematic diagram of an illustrative tag tree that is stored separate from a sequence of text records.

FIG. 2b is a schematic diagram of illustrative content 218 that is associated with a tag tree 220. The tag tree 220 may store information on how to format text, images, and other objects in the text records 206. The tag tree 220 of FIG. 2b may be stored separate from a sequence of text records 206.

The tag tree 220 may include (push) information for the open format tag 212 in the sequence of the text records 206. The tag tree 220 may include (pop) information for the close format tag in the sequence of the text records 206. In use, the tag tree 220 may be traversed using an index to enable the reader application to identify active format tags for a selected (parsed) text record. However, the tag tree 220 may require more storage space and time for reconstructing each stack as compared to the format tag stacks 208 that are described with reference to FIG. 2a.

Figure 3:
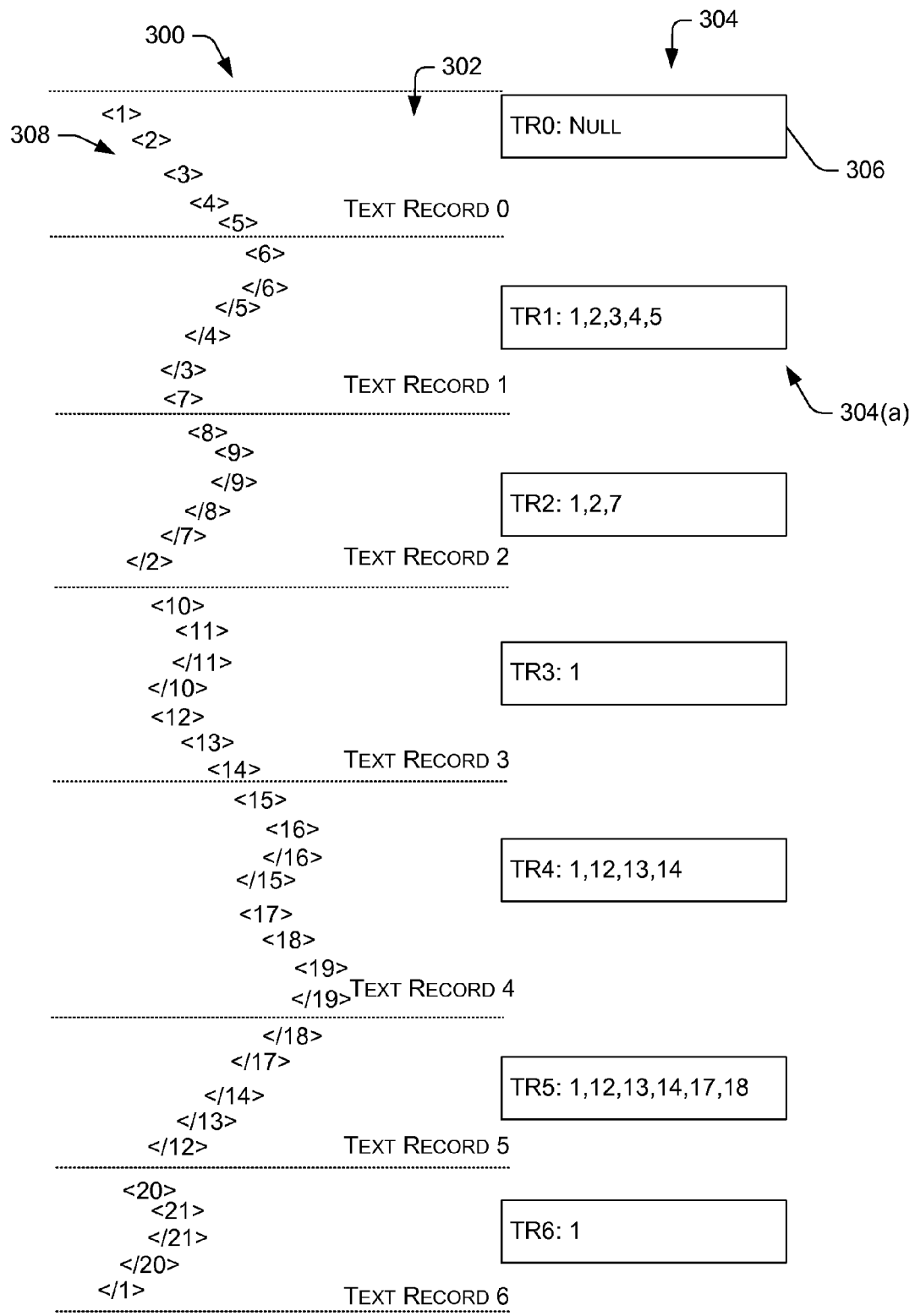
FIG. 3 is an illustrative skeletal structure of formatting code for a series of text records.

FIG. 3 is an illustrative skeletal structure 300 of formatting code for a series of text records. The segmentation module 118 may segment content represented by the skeletal structure 300 into a series of text records 302 denoted as TR0, TR1, TR6. Each text record may include a corresponding format tag stack 304 (i.e., active format tag stack) that may include a list of format tags that are active (i.e., open). The format tag stack may be stored in a data container 306 associated with the text record. The illustrative format tag stacks are similar to the format tag stacks 208 shown in FIG. 2a, each being stored within and associated with one of the text records 206.

A representation 308 of format tags is shown in chronological order in the skeletal structure 300. In the skeletal structure 300, a first instance of a unique number of the representation may represent an open format tag and the second instance of the same number may represent a closed format tag. Thus, the representation 308 of the text record TR1 includes opening and closing of the format tag number 6, the closing of the format tag numbers 3, 4, 5 and the opening of a format tag number 7. Here, a corresponding format tag stack 304(a) may include a list of the open tag formats at a start location, such as the beginning of the text record TR1. The format tag stack 304(a) may list active format tags which include the format tags 1, 2, 3, 4, and 5. When the format tags are closed, they are deactivated (discarded) and not stored in subsequent stacks. For example, the closed format stacks 3, 4, 5, 6 that are closed in the second text record TR2 are not listed in the third format tag record TR2.

In some embodiments, duplication of data may be avoided by pointing to repeated data from previous records. For example, the format tag stacks 304 may be represented by an equivalent short form as listed below in Table 1.

TABLE 1

| TR0 | NULL |
|-----|------|
| TR1 | 1, 2, 3, 4, 5 |
| TR2 | P(2), 7 |
| TR3 | P(1) |
| TR4 | P(1), 12, 13, 14 |
| TR5 | P(4), 17, 18 |
| TR6 | P(1) |

In Table 1, the table row (TR) is listed with open tags at a restore point, which may be an intermediate point in a text record, at the start of a paragraph, section, etc., or another location in a piece of content. A previous value (P) is a carryover value from the previous restore point. For example, P(2) indicates that the first two tags from the previous restore point are included in the current record.

Illustrative Operation

Figure 4:
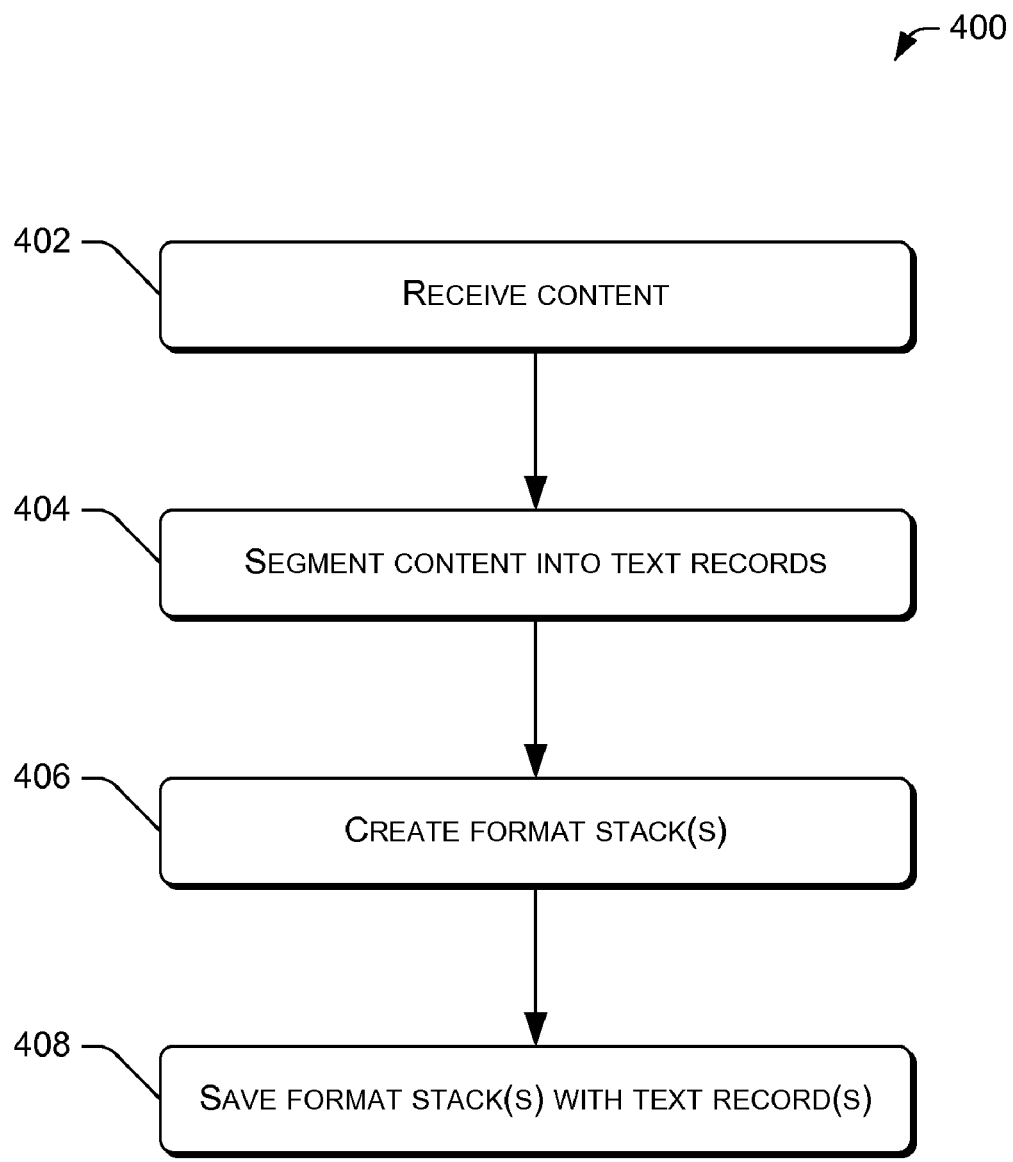
FIG. 4 is flow diagram of an illustrative process of creating a format tag stack for storage with text records.

FIG. 4 shows an illustrative process 400 of creating a format tag stack for storage with text records. The process 400 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 400, shall be interpreted accordingly. The process 400 may be performed by the parsing application 116 and/or any of the modules of the image parsing application that are stored on the electronic distribution server(s) 102.

At 402, the electronic distribution server 102 receives content from a publisher, author, or other source. The content may be received in electronic form or may be converted from a print form to an electronic form using optical character recognition (OCR) software. The content may include format tags that indicate when to apply a variety of formats to text and/or images in the content.

At 404, the segmentation module 118 segments the content into text records. The text records may be of fixed size or a variable size based on factors such as data size, number of characters or words, breaks in the content (chapters, section, etc.), or other factors.

At 406, the stack module 120 locates format tags included with the content to compile format tag stacks the text records. In some embodiments, a single format tag stack may be associated with each text record. In other embodiments, more or fewer format tag stacks may be associated with each text record. The format tag stack may include a start parsing location, a tag stack (e.g., HTML tag stack), and a length. In some embodiments, the start parsing location and the length are encoded using a variable-length code. The tag stack may be stored in plain text using UTF-8/WIN-1252 encoding depending on the encoding of the content. In some embodiments, the tag stack is encoded using a same coding algorithm that is used for the content (text). In some embodiments, the format tag stack may also include a breakpoint indicator to indicate when the restore point is located at the start of a paragraph, section, or other break in content. The breakpoint indicator may ultimately enable the reader application 130 to apply special formatting using Cascading Style Sheets (CSS), such as an indentation to text (e.g., at a first line of text, etc.) when the breakpoint indicator indicates that special formatting may be applied at the restore point. Because some special formatting does not have corresponding format tags, such as special styling in the CSS, the special formatting may be omitted when the breakpoint indicator is not included in the format tag stack.

At 408, the stack module 120 saves an instance of the format stack with an associated text record. In various embodiments, the format tag stacks may be created sequentially by traversing the content from a beginning to an end. At a point in each text record, such as the end of the text record, the stack module 120 may save the current stack having active format tags in the text record, and then proceed to parse additional information in the content until another save location (possibly in another text record) is reached by the parser. Thus, the stack module 120 may create individual and distinct format tag stacks as the formatting code (e.g., HTML code) is parsed by the parsing application 116 in a sequential order.

The active format tags are format tags that have not been closed prior to the start parsing location.

Figure 5:
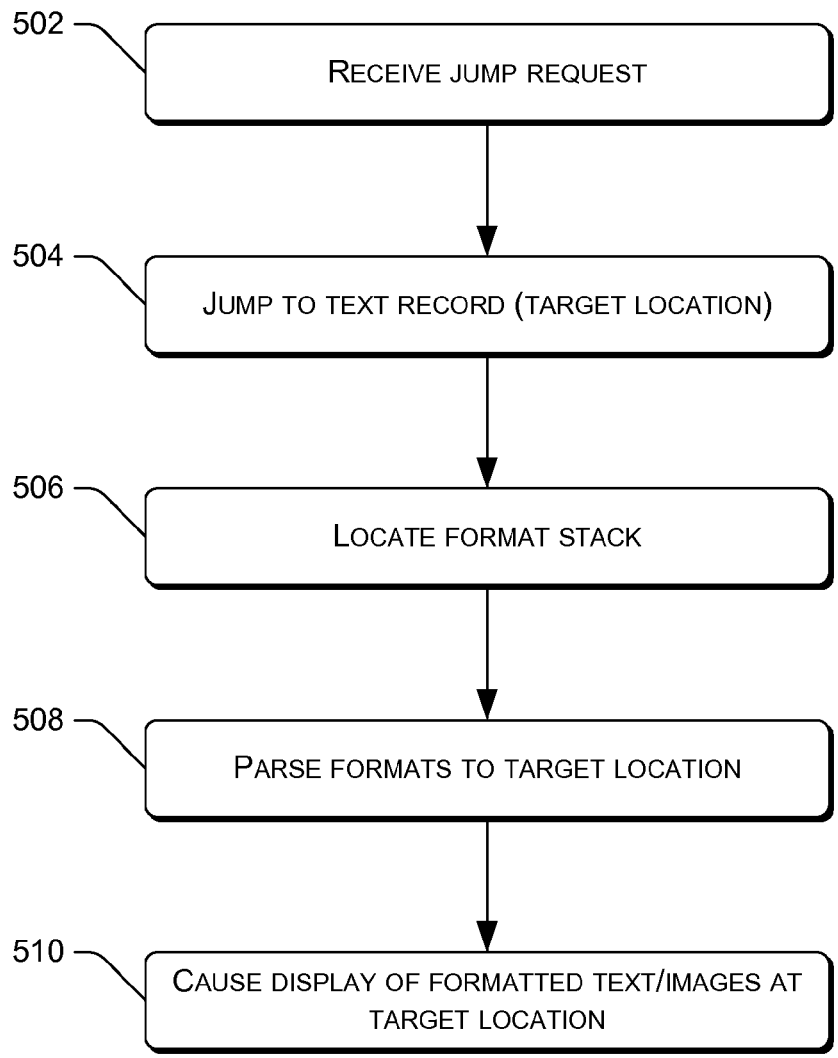
FIG. 5 is flow diagram of an illustrative process of retrieving format tag stacks upon receipt of a user request to navigate to a new location in the content.

FIG. 5 is flow diagram of an illustrative process 500 of retrieving format tag stacks upon receipt of a user request to navigate to a new location in the content. The process 500 may be performed by the reader application 130 stored on the viewing device 104.

At 502, the reader application may receive a request from the user 122 to navigate (jump) to a specific portion of the content 108. For example, the user may desire to begin reading an electronic reference book (i.e., e-book) at the start of chapter 10. The user may navigate to the target location of chapter 10 (or another location) using controls of the reader application 130. In some embodiments, the user may navigate to the target location using word search queries or other search mechanisms and/or links (e.g., hyperlinks).

At 504, the reader application 130 may locate a text record associated with the jump request as a target location. The text record may correspond to the target location. For example, chapter 10 may be the tenth text record when text records are segmented based on chapter breaks. However, in some embodiments this operation may be omitted when the content is not segmented into text records.

At 506, the reader application 130 may locate a restore point in the content that precedes the target location. The restore point may have an associated format tag stack. The format tag stack may be stored in a data container and may include a first portion to identify the corresponding restore point that identifies a start location of the active format tags, a second portion to store the active format tags, and a third portion to store a length of the format tag stack.

In some embodiments, the restore point may be located at the start of a paragraph, section, or other break in the content. The format tag stack may indicate when the restore point is at a break in the content (e.g., the start of a paragraph, section, etc.) by including the breakpoint indicator in the data container. The breakpoint indicator may specify the type of break, such as a start of a paragraph, section, and so forth. The reader application 130, upon detection of the breakpoint indicator, may then apply special formatting (styling) using CSS to text that begins at a breakpoint. For example, when the breakpoint indicator denotes that the restore point is at the beginning of a paragraph, the reader application 130 may insert an indentation into the content. The indentation may otherwise be omitted absent use of the breakpoint indicator because indentations may not include a formatting tag, but instead rely on special formatting with CSS that depends from a location of text in a paragraph, section, and so forth (e.g., at the start of a paragraph, section, etc.).

At 508, the reader application 130 may parse the text record from the restore point to the target location to update the tag stack. In this way, the reader application may only have to parse a fraction of the content 108 to determine an intended format for text and/or images at the target location. Alternatively, the reader application would have to parse all text before the target location to obtain the intended format, which could result in user-perceived latency.

At 510, the reader application 130 may cause a display of the text and/or images at the target location using the format information stored in updated format tag stack.

Figure 6:
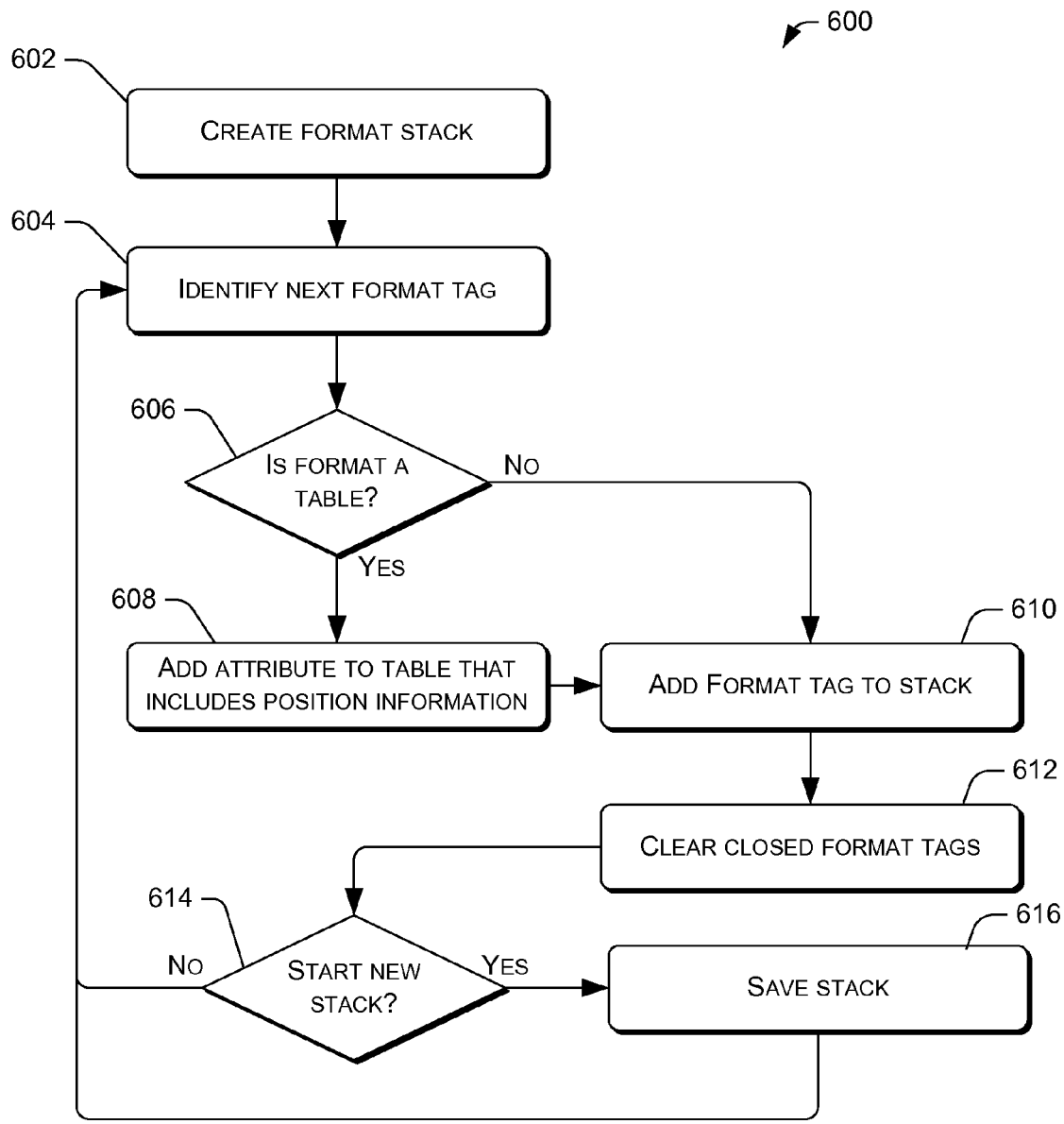
FIG. 6 is flow diagram of an illustrative process of creating a format tag stack that includes a table format.

FIG. 6 is flow diagram of an illustrative process 600 of creating a format tag stack that includes a table format. The process 600 may be performed by the parsing application 116 and/or any of the modules of the image parsing application that are stored on the electronic distribution server(s) 102.

At 602, the stack module 120 may create a format stack which may be used to create and save individual format tag stacks that are associated with various text records.

At 604, the stack module 120 may identify a format tag in the content. For example, the format tags may format text as headers, bold, italics, underline, tables, paragraphs, and so forth.

At 606, the stack module 120 may determine whether the tag format that was identified at the operation 604 is a table. When the format tag is a table, the stack module 120 may continue the process 600 by adding an attribute to the table that includes position information of the table at 608. Tables may require additional analysis by the stack module 120 to determine an intended layout of the table because a table's layout may be defined by an amount of text contained in various cells of the table. For example, a cell with ten words of text may have a larger width and/or height value than comparable cell having less text.

At 610, the stack module 120 may add the format tag to the format tag stack. When the format is determined to be a format other than a table at 606, the process 600 may continue at the operation 610 to add the format tag (which is identified at the operation 604) to the format tag stack.

At 612, the stack module 120 may clear (remove) closed format tags from the stack. For example, when the formatting software is HTML code, and a format tag of "</b>" is identified at the operation 604, and then the stack may clear a corresponding open tag of "<b>" from the stack.

At 614, the stack module 120 may determine whether the stack module will create a new stack. For example, a new stack may be created when a new text record is loaded by the parser, after a predetermined interval of text, or for other reasons.

The stack module may save the stack in a data container associated with the text record at 616. In some embodiments, the stack may be saved in a subsequent (or preceding) text record, which may enable the reader application to obtain current formatting up to the start of the subsequent (or preceding) text record. For example, the format tag stack may save a copy of the format tag stack prior to moving to the next text record. In this way, the saved format tag stack contains format tags that enable formatting text of the associated text record without requiring the reader application 130 parse all of the content prior to the text record. After the operation 616, the process 600 may return to the operation 604 to identify a next format tag when the stack module 120 identifies that additional text is in need of analysis.

Figure 7:
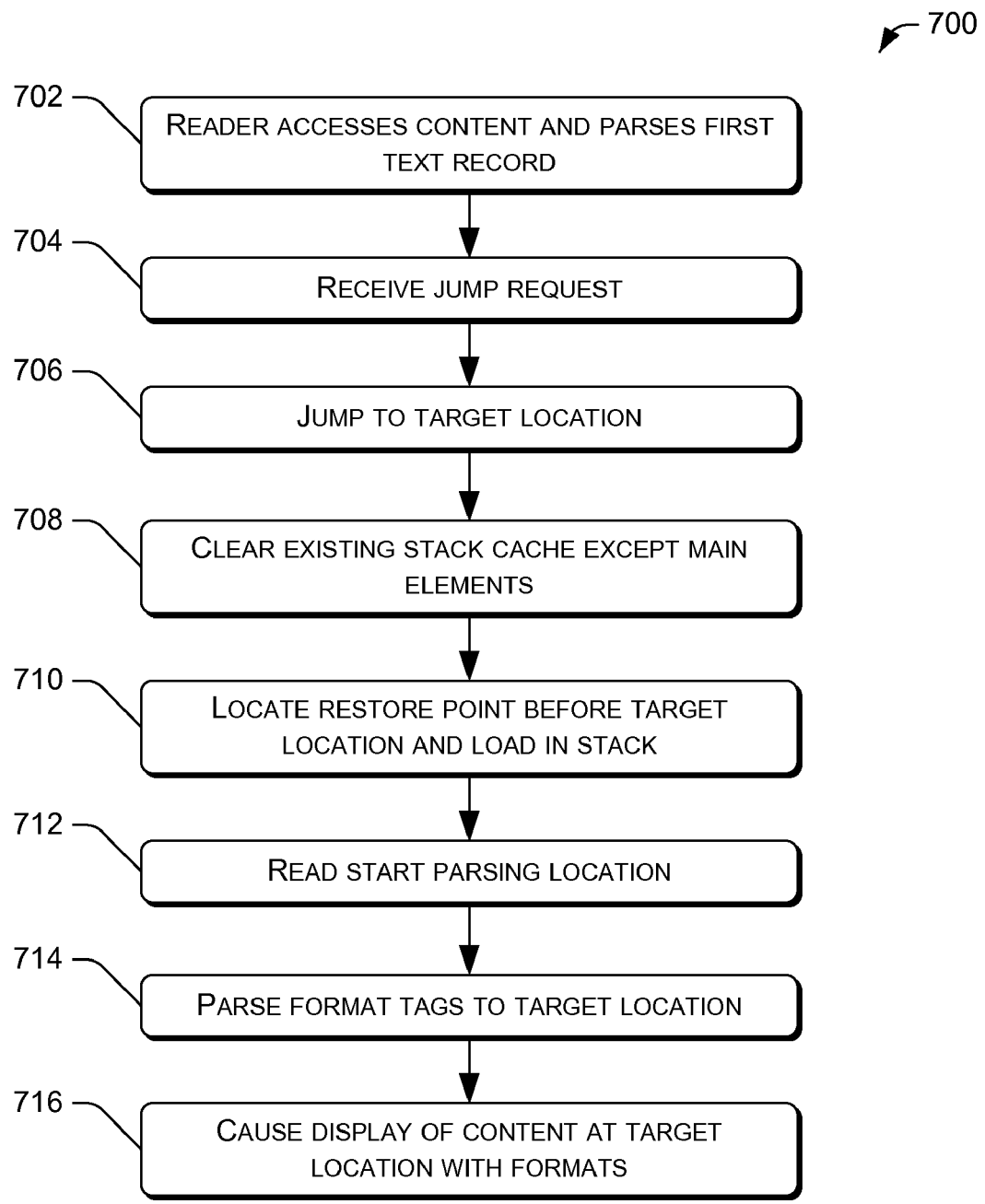
FIG. 7 is flow diagram of an illustrative process of retrieving format tag stacks.

FIG. 7 is flow diagram of an illustrative process 700 of retrieving format tag stacks. The process 700 may be performed by the reader application 130 stored on the viewing device 104.

At 702, the reader application 130 may access the content 108 and parse the first text record. For example, as shown in FIG. 2a, the first text record 206(1) may be parsed by identifying and logging all of the format tags in the first text record. When a tag is closed, the tag may be discarded and omitted from a saved format tag stack. By parsing the first record of the content, the reader application 130 may present an introduction screen, via the viewing device 104, to the user 122.

At 704, the reader application 130 may receive a jump request to a target location from the user 122. For example, the user may desire to navigate ahead to an intermediate section of the content, such as the sports section of an electronic newspaper.

At 706, the reader application 130 may advance to a text record (or portion thereof) corresponding to the jump request that was received at the operation 706.

At 708, the reader application 130 may clear existing data in a format tag stack cache but retain main formatting elements. For example, when using HTML formatting software, the reader application may retain "<html>" and "<body>" format tags in the format tag stack cache.

At 710, the reader application 130 may locate a restore point before the target location (received at 704). Often, the reader application 130 selects the closest restore point prior to the target location at 710. However in some instances, it may be desirable to select an earlier restore point. For example, a jump request may be a request to navigate to an earlier point in a document. A selected restore point, when parsed and text is laid out (and/or other content), may not fill a screen output because the restore point is too close to the target location. In this instance, an earlier restore point may be selected which enables the parser to fill then entire screen with text (or other content). In some embodiments, the restore point may be at the beginning of a page, paragraph, or other location which may enable display of an entire screen of text (or other content). However, in some instances, a user may desire to navigate to a middle of a page or another location that does not correspond to restore point that fills the entire screen, in which case it may be desirable to select an earlier (preceding) restore point.

In some embodiments, the format tag stack associated with the restore point may be stored in a data container associated with the text record.

At 712, the reader application 130 may read a start parsing location from the format tag stack. The start parsing location may be a field of data in the format tag stack that indicates a point in the content 108 from which the format tag stack contains format tags.

At 714, the reader application may parse format tags in the text record up to the target location to update the format tag stack cache. In this way, the format tag stack cache includes all the formatting necessary to format text and/or images of the content 108 in the text record (or portion thereof) that corresponds to the target location without parsing additional portions of the content (e.g., other text records).

At 716, the reader application 130 may cause a display of the content 108 of the text record at the target location by applying the formats in the format tag stack cache to text and/or images of the text record. The reader application 130 may cause the viewing device 104 to display the formatted text and/or image for view by the user 122.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of formatting content with hyper text markup language (HTML) code, the method comprising:
   receiving content having the HTML code with format tags;
   segmenting the content into a plurality of text records; and
   sequentially parsing the content to create a plurality of format tag stacks, wherein each format tag stack is associated with one of the plurality of text records, the sequentially parsing including:
      identifying the format tags in the HTML code;
      for each format tag identified:
         adding the format tag to one of the plurality of format tag stacks when the format tag is opened;
         removing the format tag from one of the plurality of format tag stacks when the format tag is closed; and
         storing the plurality of format tag stacks with the plurality of text records, wherein each format tag stack provides active format tags of the content up to a corresponding restore point in the HTML code, the format tag being active when the tag is opened and not yet closed for the corresponding restore point.

2. The method as recited in claim 1, wherein each format tag stack includes a first portion to identify the corresponding restore point that identifies a start location of the active format tags, a second portion to store the active format tags, and a third portion to store a length of the format tag stack.

3. The method as recited in claim 1, wherein the segmenting the content is based on a predetermined data size of each text record.

4. The method of claim 1, wherein each format tag stack is stored in the HTML code in a data container.

5. The method of claim 4, wherein the sequentially parsing further includes:
   identifying a table format tag as a tag format; and
   storing a table start position in the data container as an attribute of the table format tag.

6. The method as recited in claim 1, wherein at least one format tag identified is added to and removed from a same format tag stack.

7. A method of rendering electronic content, the method comprising:
   receiving a jump request to identify a portion of the electronic content as a target location for display on a viewing device, the electronic content being segmented into multiple text records where each text record is associated with one of a plurality of format tag stacks created for the electronic content;
   determining a restore point before the target location, the restore point being located at a beginning of a text record;
   locating a format tag stack associated with the text record, the format tag stack including active format tags of the electronic content up to the restore point, the active format tags being in an opened state;
   loading the format tag stack into a format tag stack cache;
   parsing intermediate format tags from the restore point to the target location to update the format tag stack stored in the format tag stack cache;
   formatting the electronic content of the text record based on the format tag stack; and
   causing the display of at least a portion of the formatted electronic content of the text record at the target location.

8. The method as recited in claim 7, further comprising parsing another text record of the electronic content to cause the display of an introduction page of the electronic content.

9. The method as recited in claim 7, further comprising clearing data in the format tag stack cache except for main tags of <html> and <body>.

10. The method as recited in claim 7, wherein the format tag stack is stored in a data container associated with the text record.

11. The method as recited in claim 10, wherein the restore point is selected based on whether a distance between the restore point and the target location exceeds a predetermined threshold to enable collection of enough text to fill a screen output.

12. The method as recited in claim 11, wherein:
the format tag stack is loaded from the data container associated with the text record when the distance is within the predetermined threshold from the target location; or
the format tag stack is loaded from a different data container associated with a previous text record when the distance is outside of the predetermined threshold from the target location.

13. One or more non-transitory computer-readable media storing computer-executable instructions that, when executed, cause one or more processors to perform acts comprising:
receiving content that includes a predetermined format and body text;
segmenting the content into multiple text records that are independently viewable;
parsing the content via a sequential process to identify active format tags of the content for each of the multiple text records at predetermined locations within the content, the active format tags being in an opened state; and
storing each of the active format tags in one of a plurality of format tag stacks associated with the content, each format tag stack to provide active format tags up to one of the predetermined locations within the content.

14. The one or more non-transitory computer-readable media as recited in claim 13, wherein the active format tags are tags that are open, and wherein the open tags are deactivated when a corresponding closed format tag is identified during the sequential process.

15. The one or more non-transitory computer-readable media as recited in claim 13, wherein each of the plurality of format tag stacks are stored in a respective one of the multiple text records during the sequential process.

16. The one or more non-transitory computer-readable media as recited in claim 13, wherein each format tag stack is stored in the HTML code in a data container associated with one of the multiple text records.

17. The one or more non-transitory computer-readable media as recited in claim 13, wherein each format tag stack includes a first portion to identify a corresponding restore point that identifies a start location of the active format tags stored therein, a second portion to store the active format tags stored therein, a third portion to store a length of the format tag stack, and a fourth portion to store a breakpoint indictor to indicate a type of break of content at the corresponding restore point.

18. The one or more non-transitory computer-readable media as recited in claim 17, further comprising:
identifying at least one active format tag as an open table tag, and
storing a start position as an attribute of the open table tag.

19. A system comprising:
one or more processors; and
memory having instructions that are executable by the one or more processors, the instructions to cause the one or more processors to:
receive content that includes text and formatting instructions that are stored in a plurality of format tag stacks at known restore points within the content;
select a target location of the content;
locate a format tag stack at a known restore point before the target location, the format tag stack including active format tags of the content up to the known restore point, the active format tags being in an opened state;
update the format tag stack with intermediate format tags located between the known restore point and the target location by parsing a portion of the content located between the known restore point and the target location;
format the target location of the content based on updated instructions stored in the format tag stack; and
cause the display of the target location of the content that is formatted based on the updated instructions.

20. The system as recited in claim 19, wherein the select the target location includes receiving a user request to navigate to the target location of the content.

21. The system as recited in claim 19, wherein the formatting instructions are hyper text markup language (HTML) formatting instructions.

22. The system as recited in claim 19, wherein the target location of the content is associated with a text record of a segment of the content.

23. The system as recited in claim 22, wherein the format tag stack is stored in a data container associated with the text record.

24. One or more non-transitory computer-readable media storing computer-executable instructions that, when executed, cause one or more processors to perform acts comprising:
receiving content divided into a plurality of text records;
receiving a plurality of format tag stacks that include formatting instructions to format the content;
receiving a jump request that identifies a portion of a text record as a target location for display on a viewing device;
locating a format tag stack that is associated with the text record, the format tag stack including active format tags of the content up to a restore point of the text record, the active format tags being in an opened state; and
formatting the portion of the text record based at least in part on one or more of the active format tags in the format tag stack.

25. The one or more non-transitory computer-readable media as recited in claim 24, further comprising updating the active format tags by parsing format tags from the restore point to the target location prior to a display of the portion of the text record.

* * * * *

UNITED STATES PATENT AND TRADEMARK OFFICE
CERTIFICATE OF CORRECTION

PATENT NO. : 8,402,366 B1
APPLICATION NO. : 12/641969
DATED : March 19, 2013
INVENTOR(S) : Martin Gorner et al.

Page 1 of 1

It is certified that error appears in the above-identified patent and that said Letters Patent is hereby corrected as shown below:

On the Title Page, item 75

Column 1, line 6, change "Rangasamy Surendran" to -- Surendran Rangasamy --.

Signed and Sealed this
Thirtieth Day of April, 2013

Teresa Stanek Rea
*Acting Director of the United States Patent and Trademark Office*